United States Patent Office 3,801,713
Patented Apr. 2, 1974

3,801,713
METHOD OF PRODUCING PROTEIN-CONTAINING LAMELLAR STRUCTURE MEAT SUBSTITUTE
Vladimir Borisovich Tolstoguzov, prospekt Vernadskogo 24a, kv. 95; Alexandr Ivanovich Mzhelsky, 2 Sinichkina ulitsa 8, kv. 3; Vera Alexandrovna Ershova, 48 Kvartal Belyaevo-Bogorodskoe, korpus 23, kv. 234; Evgeny Evgenievich Braudo, Festivalnaya ulitsa 33, kv. 90; and Natalia Vasilievna Mikheeva, ulitsa Raduzhnaya 3, korpus 2, kv. 51, all of Moscow, U.S.S.R.
No Drawing. Filed Apr. 5, 1971, Ser. No. 131,352
Claims priority, application U.S.S.R., Apr. 24, 1970, 1427320, 1427326
Int. Cl. A23j *3/00*; A23l *1/34*
U.S. Cl. 426—239                                        12 Claims

ABSTRACT OF THE DISCLOSURE

A lamellar structure meat substitute is prepared by first diffusing polyvalent metal ions through a semi-permeable membrane into a colloidal solution to form a gel followed by freezing and defrosting of the gel to develop lamellar structure therein and impregnating and bonding the lamellar structure elements with an edible binder.

---

The present invention relates to methods of producing protein-containing foodstuffs of lamellar structure and has particular reference to methods of producing such foodstuffs capable of resembling natural meat products.

Known heretofore is a method of producing meat substitutes of lamellar structure resembling, say, bacon or ham (cf. French Pat. No. 1,400,678 of May 28, 1965). Said method is based upon a widespread "wet" technique used in producing man-made textile fibres according to which a preliminary prepared colloidal solution containing food substances and pectizing agents, is passed through spinning jets or spinnerets into a precipitation vat containing solutions of edible acids or salts.

As a result of the treatment of the colloidal solution with the solutions of edible acids or salts, the food substances contained in said colloidal solutions are coagulated to form fine fibres, whereupon said fine fibres are bonded together with a binder incorporating an aqueous solution of vegetable proteins, a food color, common salt, monosodium glutamate, yeast hydrolysate and dispersed vegeable oil. The thus-obtained mixture, with its fibres arranged in a random manner, is rolled out into a thin layer on a pan, whereupon the rolled out layers are placed one upon another to form a plate a few centimetres thick, said lamellar plate of a meat substitute being baked, sliced and exposed to smoke-curing.

The above-described method is a complicated and multi-staged one since the obtaining of lamellar-structure elements involves numerous operations such as producing monofibres, arranging these into layers, impregnating and bonding the layers with food binders.

Also, the known method involves the use of expensive equipment in the stage of the "wet" shaping process which largely increases the cost of the finished product.

It is an object of the present invention to provide a method that simplifies and expedites the production process of a protein-containing foodstuff resembling natural lamellar-structure meat products, as well as a method which makes the process less labor consuming.

It is another object of the present invention to provide a method that makes it possible to dispense with expensive equipment, thereby cutting down the cost of the product obtained.

According to the present invention there is provided a method for producing protein-containing foodstuffs resembling lamellar-structure meat products and incorporating food, flavoring, aromatizing and dyeing substances, said method involving the preparation of colloidal solutions, formation of lamellar-structure elements from said colloidal solutions, as well as the operations of impregnating and bonding said elements together with food binders. According to the invention, a simultaneous formation of a number of lamellar-structure elements occurs when said colloidal solution comes in contact with solutions of salts of metals having a valence of at least two through a semi-permeable membrane by virtue of diffusion of ions of the abovesaid metals therethrough, resulting in the formation of an ionotropic gel which is then subjected to cogelation and defrosting to split said gel into lamellar-structure elements, whereupon the lamellar-structure elements resulting from defrosting of said gel are impregnated and bonded together with food binders.

It is preferred that the process of diffusion of ions of the metals having a valence of at least two and impregnation of the lamellar-structure elements with food binders be carried out under the effect of an electric field at a potential difference of from 10 to 5000 volts.

It is likewise preferred that congealing of the ionotropic gel occur within the temperature range from $-1°$ to $-100°$ C.

Furthermore, the lamellar-structure elements are preferably impregnated with food binders at a pressure of from 1.1 to 10 atm.

It is also possible to impregnate the lamellar-structure elements with food binders under a vacuum of from 100 to 750 mm. Hg.

In the method disclosed herein use is made of cellophane or collodion films as a semipermeable a membrane.

The present method may employ as a colloidal solution various solutions of charged polysaccharides or mixtures thereof with food substances.

The essence of the present method resides in a simultaneous production of a number of lamellar-structure elements straight from the colloidal solution, thus obviating the operations of producing monofibres, arrangement of the fibres into layers, impregnating and bonding these together which makes the method less labor-consuming.

The herein-proposed method involves no expensive-equipment, thus substantially reducing the cost of the finished product.

The method proposed herein makes it possible to produce protein-containing foodstuffs resembling lamellar-structure meat products faster than by the known method, due to a possibility of employing, with a view to increasing the rate of the diffusion process at the stage of preparing an ionotropic gel, the potential difference of an electric field, as well as due to the use of electric potential difference in combination with a positive or a negative pressure in the process of impregnating with food binders.

To make the method of the invention more apparent, provided below is a detailed description thereof accompanied by a number of examples illustrating the production of lamellar-structure protein-containing foodstuffs obtained according to the method of the invention.

The method of the invention is carried out as follows:
A colloidal solution is prepared containing pectizing agents or mixtures thereof with food substances.

As pectizing agents use is made of charged polysaccharides such as alginates, pectates, low-ester pectins, while in the capacity of food substances there are employed animal, vegetable or microbiological-origin proteins such as casein, soybean or yeast protein.

The thus-prepared colloidal solution is poured into a vessel provided with a semi-permeable membrane such as cellophane or collodion films.

Then said vessel is put into a coagulation vat containing solutions of salts of metals having a valence of at least two, e.g., calcium acetate, calcium chloride or aluminium chloride.

Diffusion of ions of the metals having a valence of at least two through said semi-permeable membrane into said colloidal solutions results in the formation of an ionotropic gel.

To increase the rate of the diffusion process the colloidal solution and the solution of salts of at least bivalent metals may be placed in an electric field at a potential difference of from 10 to 5000 volts, preferably from 100 to 2000 volts. This is instrumental in making the rate of the diffusion of ions of metals having a valence of at least two through the membrane 3 to 50 times as high as the rate without the electric field.

Once a complete formation of ionotropic gel having lamellar structure in the entire volume of the colloidal solution has occurred, the gel is exposed to a slow-rate congelation in the temperature range of from $-1°$ to $-100°$ C., preferably from $-3°$ to $-30°$ C. Next, the congealed gel is subjected to defrosting.

As a result of congealing and defrosting the gel is divided or split into lamellar-structure elements which are essentially a few thin parallel layers 0.1 to 1 mm. thick.

Division or splitting of the gel when congealed and defrosted results from the lamellar structure of the starting gel. Congelation of the gel is conducive to a mere separation of the structural elements thereof due to the expansion of an aqueous dispersive medium when crystallizing.

Minute needle-shaped ice crystals arising in the frozen gel deform the surface of the lamellar-structure elements of the gel that are exposed upon defrosting and separation of the aqueous phase therefrom in the form of thin layers featuring the characteristic fibrous pattern on the surface thereof.

The ionotropic gel thus split into elements or layers, is impregnated with food binders employing substances capable of pectization when heated or cooled, such as egg white and albumin, starch, gluten, gelatin, and agar-agar.

As binders use can also be made of high-melting fats such as beef fat or margarine.

Food binders capable of pectization when cooled are used only for the preparation of meat-resembling products that require no further culinary treatment when cooked.

To expedite the impregnation process of the lamellar-structure gel it is recomended that the gel-formation process (or pectization) be carried out in vessels equipped with a cylindrical membrane which enables a simultaneous formation of a few coaxial cylindrical elements of lamellar structure. Such an arrangement of said elements facilitates the impregnation process thereof since the gaps between the cylindrical lamellar-structure elements are continuous, being open only at the end faces of the gel body. In this case the impregnation process of the lamellar-structure elements may occur by pouring a food binder from the top face of the gel body into the gaps between the coaxially arranged lamellar-structure elements.

The impregnation process may be intensified to allow more rapid impregnation by applying to both end faces of the gel body an electric potential difference equal to 10-5000 volts, preferably 100-2000 volts.

Such an intensification of the impregnation process may be attained by virtue of either positive or negative pressure applied to either of the end faces of the gel body. To this end, the gel body has one of its end faces immersed in the food binder, a pressure of from 1.1 to 10 atm., preferably from 1.1 to 3 atm. being applied to the end face immersed in the food binder, while a negative pressure (vacuum) from 100 to 750 mm. Hg, preferably from 200 to 500 mm. Hg, is applied to the non-immersed end face of the gel body. The lamellar-structure elements impregnated with food binders are then bonded together.

In case substances capable of gelation or pectization when heated are used as food binders, e.g., egg white and albumin, bonding is effected by heating the gel to a temperature ranging from 50 to 200° C.

Conversely, if in the capacity of food binders use is made of substances that pectize or jellify when cooled, e.g., gelatin, bonding is carried out at a temperature of from $+1°$ to $+25°$ C.

Introduced into the composition of the lamellar-structure protein-containing foodstuffs being produced are various aromatizing, flavoring and dyeing substances. Said substances may be introduced either into the starting colloidal solution or into the solution of food binders.

Employed as aromatizing and flavoring additives may be, for example, vitamins, mineral salts, mixtures of aminoacids, various-origin aminoacid hydrolysates, including those of vegetable proteins or yeast, as well as common salt, monosodium glutamate, inosinates, and the products of Maillard's reaction. In addition, as the abovesaid aromatizing and flavoring agents use may be made of a variety of animal fats and extracts, such as beef or chicken fat and fish oil, as well as spices and powdered garlic.

Dyeing agents employed may be any suitable food colors, such as beet tea caramel colors or food serum albumin.

Foodstuff substitutes produced according to the method proposed herein, resemble meat products, such as fried meat, smoked meat, bacon, liver and, after having been through a corresponding culinary treatment, minced meat products. Foodstuff substitutes made by the method of the invention can also be subjected to freezing and stored in frozen state for a long period of time.

The herein-proposed method enables the production of high-quality foodstuffs resembling meat and featuring a definite required ratio of important nutrient components therein, allowing such foodstuffs to be utilized for dietetic service.

The herein-disclosed method is likewise practicable for the preparation of meat-resembling foodstuff substitutes from a variety of nutritive raw stock, including proteins and protein-containing products not utilized or utilized inadequately due to low attractiveness and utilization characteristics thereof, such as casein, nonfat dry milk, hydrolysates and proteins of yeast, cake or trash fish, as well as a variety of rejected waste of the food industry, broken-out shell egg, waste products of meat or groats processing, and various kinds of starch.

Given below are examples illustrating the present invention.

EXAMPLE 1

To prepare a lamellar-structure gel, 4 g. of sodium alginate with a molecular weight of 80,000 and 1 g. of food serum albumin are dissolved in 195 g. of water. The resultant solution is poured in a glass ring 150 mm. in diameter and 50 mm. high covered from beneath with a cellophane membrane stretched thereover. The solution-containing ring is put in a cell containing 500 ml. of a 10-percent aqueous calcium acetate and held therein during 6 hours at room temperature. The gel obtained is extracted from the glass ring and allowed to stand for 1 hour at $-8°$ C., whereupon the gel is subjected to defrosting at room temperature. The defrosted gel is essentially a few parallel-laid thin layers, viz., the lamellar-structure elements colored red and featuring fibrous pattern on the surface thereof.

The lamellar-structure elements are easily separable manually from one another, whereupon the separated elements are washed with water and impregnated with the solution of a food binder.

To prepare the binder, dissolved under constant stirring in 100 g. of water are 40 g. of egg powder, 40 g. of sweet margarine, 3 g. of food serum albumin, 5 g. of yeast hydrolysate, 4 g. of common salt, 0.5 g. of monosodium glutamate, ascorbic, sorbic and citric acids 0.02 g. each and 1 g. of the products of Maillard's reaction. Then the lamellar-structure elements of the gel with the binder applied thereto, are placed in a pile and steam-heated at 100° C. which results in their bonding together. The finished product, as to its organoleptic and mechano-structural characteristics, is rather stringy, poorly succulent and resembles ham.

EXAMPLE 2

A solution containing 2.5 g. of sodium pectate with a molecular weight of 50,000, 1.5 g. of casein and 196 g. of water is used to prepare the gel as described in Example 1. The lamellar-structure gel resulting from a congealing-and-defrosting procedure described in Example 1, is cut into pieces measuring 1 x 1.5 x 3 cm. each and immersed in the solution of a binder.

To prepare the binder a solution containing 30 g. of egg albumin, 30 g. of Histex (protein hydrolysate), 0.5 g. of beet-tea color, 1 g. of monosodium glutamate, 1.5 g. of the products of Maillard's reaction and ascorbic, sorbic and citric acids 0.04 g. each and 125 g. of water, is mixed with 110 g. of a 5-percent solution of corn starch.

Then the pieces of the lamellar-structure gel are maintained in the binder solution under stirring for 2.5 hours, following which the pieces are fried in chicken fat. The finished product features more delicate and succulent texture as compared to the product obtained as described in Example 1 and as to its organoleptic characteristics resembles chicken-meat goulash.

EXAMPLE 3

To prepare the lamellar-structure gel, 5 g. of low-ester pectin with a molecular weight of 50,000 and ester value of 20 percent, 1 g. of food serum albumin, 14 g. of egg albumin are dissolved in 162 g. of water. From the solution thus obtained the lamellar-structure gel is prepared as described in Example 1 with the use of a collodion membrane. A specimen body of the gel resulting from the congealing-and-defrosting procedure described in Example 1, is washed with 2 liters of water, sliced and held for 3 hours is 300 g. of a solution containing 30 g. of Histex, 0.75 g. of monosodium glutamate, 1 g. of the products of Maillard's reaction and ascorbic, sorbic and citric acids 0.03 g. each. The slices of the product are smoke-cured. The finished product features the color, texture and structure of smoked bacon.

EXAMPLE 4

A solution containing 4 g. of sodium alginate with a molecular weight of 50,000 dissolved in 196 g. of water, is poured into a central cell of a three-cell dialyzer, the anode cell thereof being filled with 300 ml. of a 10-percent solution of calcium chloride and the cathode cell being filled with the same amount of water. The cells are separated by cellophane membranes. The diffusion process occurs at room temperature and a potential difference equal to 400 volts for 10 minutes. As a result formed in the central cell of the dialyzer is a lamellar-structure gel of calcium alginate which is extracted, washed with 2 liters of water and treated as described in example to obtain the finished product similar to that described in Example 1.

EXAMPLE 5

To prepare the gel of a concentric lamellar structure, 3.6 g. of sodium alginate with a molecular weight of 80,000, and 1 g. of food serum albumin are dissolved in 170 g. of water. The solution obtained is poured in a cylindrical cellophane shell 30 mm. in diameter and 250 mm. high closed from beneath by a glass stopper; when filled with the above solution the shell is tied up from above and immersed in a glass cylinder 60 mm. in diameter and 400 mm. high containing 800 ml. of a 10 percent solution of calcium acetate. For the gel to form said shell is held therein for 6 hours at room temperature.

A specimen body of the gel measuring 30 mm. in diameter and 250 mm. high is taken out from the shell and maintained for 1 hour at —5° C., then subjected to defrosting at room temperature which results in a concentric lamellar-structure gel. The specimen is washed with 2 liters of distilled water and filled with a binder.

To prepare the binder a solution of 30 g. of egg albumin, 30 g. of Histex, 0.5 g. of beet-tea color, 1 g. of monosodium glutamate, 1.5 g. of the products of Maillard's reaction and ascorbic, sorbic and citric acids 0.04 g. each, in 125 g. of water is mixed with 100 g. of an emulsion containing 84.5 g. of water, 15 g. of corn oil and 0.5 g. of egg albumin.

The process of filling the gel with the binder is intensified by applying a potential difference of 150 volts to the end faces of the cylindrical-shaped gel specimen. The gel filled with the food binder is steam-cooked for 20 minutes. The thus-obtained product as to its mechano-structural characteristics resembles canned ham.

EXAMPLE 6

To prepare a concentrical lamellar-structure gel, 3 g. of sodium alginate with a molecular weight of 80,000, 1 g. of food serum albumin, 4 g. of soybean protein, 1 g. of monosodium glutamate, 1 g. of the products of Maillard's reaction, 0.04 g. of ascorbic acid are dissolved in 162 g. of water. The solution obtained is placed in a cylindrical cellophane shell similar to that described in Example 5.

Next the solution contained in the shell is put in a glass cylinder containing a 10-percent solution of calcium acetate.

A metal rod is introduced into the solution of sodium alginate with the other abovesaid food substances along the axis of the cylinder to serve as a cathode, and a metal ring is placed into the solution of calcium acetate to serve as an anode.

To attain higher rate of diffusion of calcium ions into the colloidal solution, a potential difference of 200 volts is applied to said cathode and said anode. In this case the diffusion process results in gel formation within 20 minutes.

The thus-obtained gel specimen is subjected to a congealing-and-defrosting procedure as in Example 5. Next, the elements of the lamellar-structure gel are vacuum impregnated with a food binder. To this end, one of the end faces of the cylindrical gel specimen is immersed in the solution of a food binder, while to the other face a vacuum of 400 mm. Hg is applied.

As a food binder use is made of a solution containing 100 g. of water, 8 g. of gelatin, 20 g. of beef fat, 9 g. of food serum albumin and 4 g. of common salt. The food binder solution is heated and stirred for 30 minutes at 50° C., whereupon the lamellar-structure gel elements are impregnated therewith at the same temperature.

Then the lamellar-structure elements impregnated with the food binder are cooled in a refrigerator for 2 hours. The finished product resembles beef roll and can be used as cold refreshments.

EXAMPLE 7

A concentrical lamellar-structure gel is prepared similar to that described in Example 6.

The impregnation of the gel with a food binder is carried out under positive pressure. To accomplish this method, a cylindrical lamellar-structure gel specimen is placed endwise on the bottom of a metal cylinder whose bore is equal to the outside diameter of the gel cylindrical portion. The bottom of said metal cylinder is made as a metal gauze, the size of meshes thereof being not in excess of 0.1 mm. Upon the gel end face opposite to that placed on the metal gauze, a solution of a food binder is deposited layer after layer under the effect of a pressure of from 1.5 to 3 atm. applied through a rod or through the intermediary of compressed air.

As the solution of the food binder, use is made of a solution containing 100 g. of water, 10 g. of wheat flour, 3 g. of beef extract, 0.2 g. of powdered pepper, 0.5 g. of powdered garlic and 2 g. of egg albumin. The finished product obtained resembles beef roll and can be utilized both in the cold and warmed state.

What we claim is:

1. A method of producing protein-containing foodstuffs resembling lamellar-structure meat products, comprising: preparing a colloidal solution of a protein-containing food substance and a pectizing agent selected from the group consisting of alginates and pectates and a solution of edible salts of metals having a valence of at least two; diffusing ions of metals having a valence of at least two from said solutions of edible salts of said metals into said colloidal solution through a semipermeable membrane by means of which said solutions come in contact with each other, with the result that an ionotropic gel is formed; freezing said gel followed by defrosting said gel to split said gel into elements of lamellar structure; impregnating said elements of lamellar structure with food binders; and bonding together said elements of lamellar structure impregnated with food binders.

2. A method as claimed in claim 1, wherein the diffusion of ions of metals having a valence of at least two and impregnation of the lamellar-structure elements with food binders are carried out under the effect of an electric field at a potential difference of from 10 to 5000 volts said potential difference being applied across the semipermeable membrane during the diffusion step and across opposing end faces of the gel during the impregnation step.

3. A method as claimed in claim 1, wherein freezing of the ionotropic gel occurs within the temperature range from $-1°$ to $-100°$ C.

4. A method as claimed in claim 1, wherein one end face of each lamellar-structure element is impregnated with food binders, with the face which is impregnated being subjected to a pressure of from 1.1 to 10 atm.

5. a method as claimed in claim 1, wherein one end face of each lamellar-structure element is impregnated with food binders while the opposing face is subjected to a vacuum of from 1000 to 750 mm. Hg.

6. A method as claimed in claim 1, wherein the semipermeable membrane is selected from the group consisting of cellophane and collodion films.

7. A method of producing protein-containing foodstuffs resembling lamellar-structure meat products, comprising: preparing a colloidal solution of pectizing agent selected from the group consisting of alginates and pectates and a solution of edible salts of metals having a valence of at least two; diffusing ions of metals having a valence of at least two from said solutions of edible salts of said metals into said colloidal solution through a semipermeable membrane by means of which said solutions come in contact with each other, with the result that an ionotropic gel is formed; freezing said gel followed by defrosting said gel to split said gel into elements of lamellar structure; impregnating said elements of lamellar structure with food binders containing a protein-containing food substance; and binding together said elements of lamellar structure impregnated with food binders.

8. The method of claim 7 wherein the diffusion of ions of metals having a valence of at least two and impregnation of the lamellar-structure elements with food binders are carried out under the effect of an electric field at a potential difference of from 10 to 5000 volts, said potential difference being applied across the semipermeable membrane during the diffusion step and across opposing end faces of the gel during the impregnation step.

9. The method of claim 7 wherein freezing of the ionotropic gel occurs within the temperature range of $-1$ to $-100°$ C.

10. The method of claim 9 wherein one end face of each lamellar-structure element is impregnated with food binders, with the face which is impregnated being subjected to a pressure of from 1.1 to 10 atm.

11. The method of claim 7 wherein one end face of each lamellar-structure element is impregnated with food binders while the opposing face is subjected to a vacuum of from 100 to 750 mm. Hg.

12. The method of claim 7 wherein the semi-permeable membrane is selected from the group consisting of cellophane and collodion films.

References Cited

UNITED STATES PATENTS 3,320,070   5/1967   Hartman _____ 99—17

A. LOUIS MONACELL, Primary Examiner

J. R. HOFFMAN, Assistant Examiner

U.S. Cl. X.R.

426—249, 274, 350, 802